United States Patent [19]

Divan

[11] 3,846,958
[45] Nov. 12, 1974

[54] APPARATUS FOR WEIGHING AND SEGREGATING SLICED BACON FROM A SLICING MACHINE

[75] Inventor: William J. Divan, Centerport, N.Y.

[73] Assignee: Cashin Systems Corp., Williston Park, N.Y.

[22] Filed: Oct. 10, 1973

[21] Appl. No.: 405,100

[52] U.S. Cl. ............... 53/59 W, 53/153, 83/77, 83/89, 83/367, 177/120
[51] Int. Cl. ......... B26d 4/56, B26d 4/24, B26d 5/00
[58] Field of Search ............. 53/59, 153; 83/77, 89, 83/209, 364, 367; 177/120

[56] References Cited
UNITED STATES PATENTS

| | | | |
|---|---|---|---|
| 2,969,099 | 1/1961 | Gillman | 177/120 |
| 3,200,864 | 8/1965 | Gillman | 83/77 X |
| 3,379,234 | 4/1968 | Kasper | 177/120 X |

Primary Examiner—Willie G. Abercrombie
Attorney, Agent, or Firm—Kane, Dalsimer, Kane, Sullivan and Kurucz

[57] ABSTRACT

A slicing machine includes a feeder for feeding a bacon belly into a continuously rotating slicing blade thereby forming slices of bacon which are deposited in shingled fashion on a continuously moving conveyor supported on a scale. When a prescribed weight of the shingled bacon is registered by the bacon weigher scale a signal is fed back to the feeder to momentarily stop the advance of the bacon belly and consequently the formation of bacon slices. This interruption segregates one shingled bacon group or draft from the next for subsequent processing and packaging. As a result of impact of slices deposited on the scale conveyor and the vibration thereof, the scale inevitably does not register the true weight of the draft. An interposed check weigher scale similarly supports a conveyor which receives each draft of shingled bacon slices initially weighed by the bacon weigher scale. The weight of this draft is registered by the check weigher scale free of any impact or vibration. This weight represents the true weight of the draft of shingled bacon slices. Should the weight of this draft be below or above the prescribed weight, a signal is fed back to a servo motor which automatically changes the set point for the bacon weigher scale. The change in set point of this scale causes the next bacon draft to be heavy or light depending on the direction of error of the previous draft weighed by the check weigher scale. If the check weigher scale registers a draft that is light, the bacon weigher scale will momentarily stop the advance of the feeder when a draft heavier than the prescribed weight is registered and by an excess amount proportional to the error of the previous draft registered by the check weigher scale. If the previous draft was heavier than the prescribed weight, the setting of the bacon weigher scale will be adjusted in a direction such that the bacon weigher will be actuated to feed back a signal when less than the prescribed weight is registered and by a lesser amount proportional to the excess weight of the previous draft. The check weigher scale also generates a signal for a reject conveyor which receives the draft of sliced bacon transferred by the check weigher conveyor. If the weight of the draft is outside of the prescribed weight tolerance, it is rejected by diverting it to another location in order that an attendant may make the proper weight of that draft. Drafts within the prescribed weight tolerance are accepted and transferred to the packaging station by a take away conveyor. An automatic cardboard dispenser is interposed between the reject conveyor and the check weigher conveyor for placing each weighed draft on a card.

15 Claims, 4 Drawing Figures

APPARATUS FOR WEIGHING AND SEGREGATING SLICED BACON FROM A SLICING MACHINE

BACKGROUND OF THE INVENTION

The present invention relates to improvements in apparatus for slicing bacon and arranging the slices in shingled form with controlled weight. Apparatus of this type is being marketed by Cashin Systems Corp., Williston Park, New York, and is disclosed in commonly assigned U.S Pat. Nos. 2,903,032 granted Sept. 8, 1959; 2,696,099 granted Jan. 23, 1961; and 3,027,924 granted Apr. 3, 1962. While this apparatus has proven to be eminently satisfactory, it is desirable to upgrade its operation and efficiency in an effort to further reduce give-away weights of bacon being sliced and minimize the time attendant personnel are required to expend in making proper weights of drafts not within the prescribed weight tolerances.

SUMMARY OF THE INVENTION

Accordingly, it is a principal object of the present invention to provide for the foregoing desired features together with an improved and more efficient apparatus for slicing, weighing and grouping slices of food product particularly bacon in shingled form with significant reductions in give-away weights and labor costs.

Other objects and advantages will become apparent from the following detailed description which is to be taken in conjunction with the accompanying drawings.

DETAILED DESCRIPTION

Figure 1:
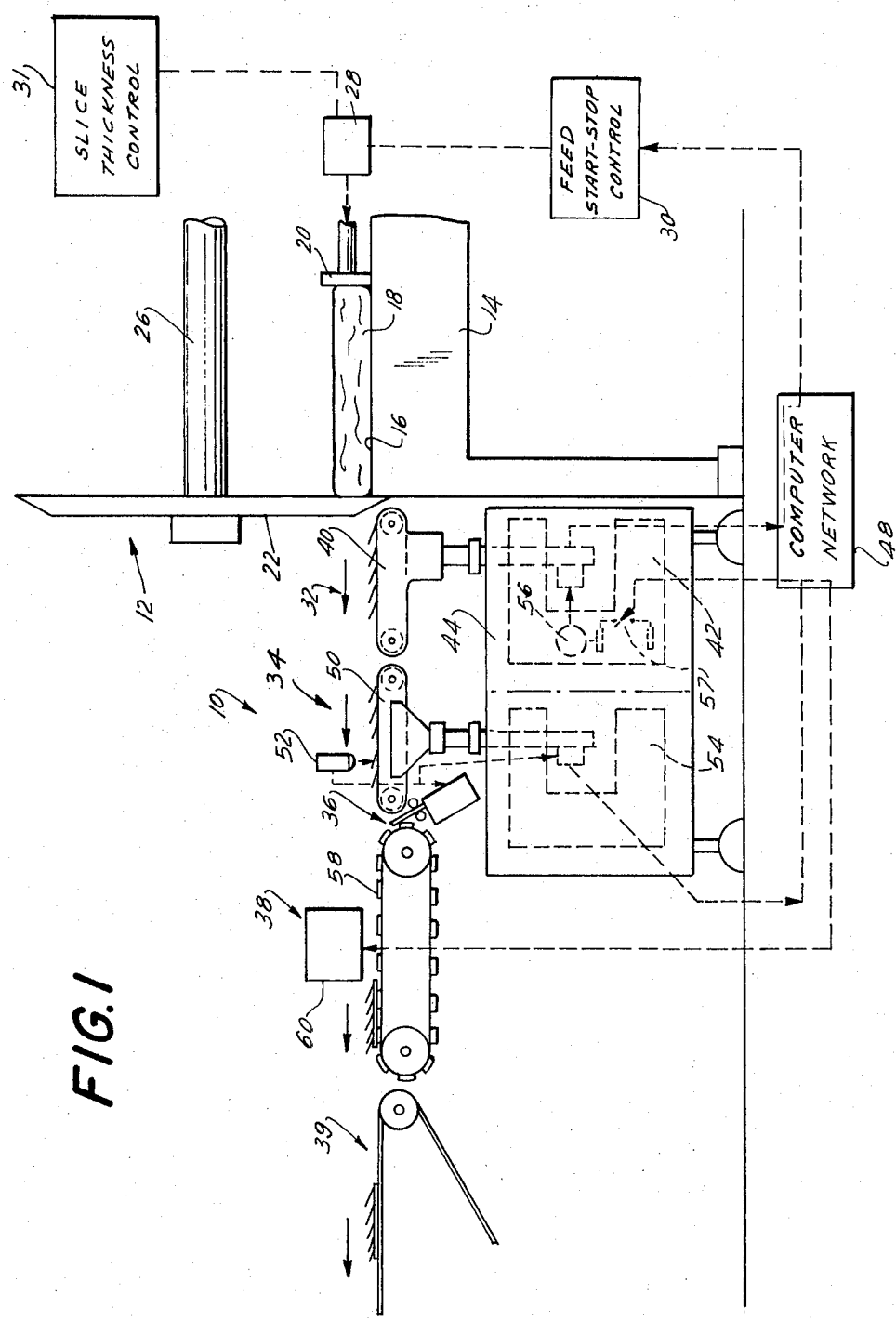
FIG. 1 is a fragmentary side elevational view of the apparatus of the present invention for slicing, weighing and grouping sliced food product.
Figure 2:
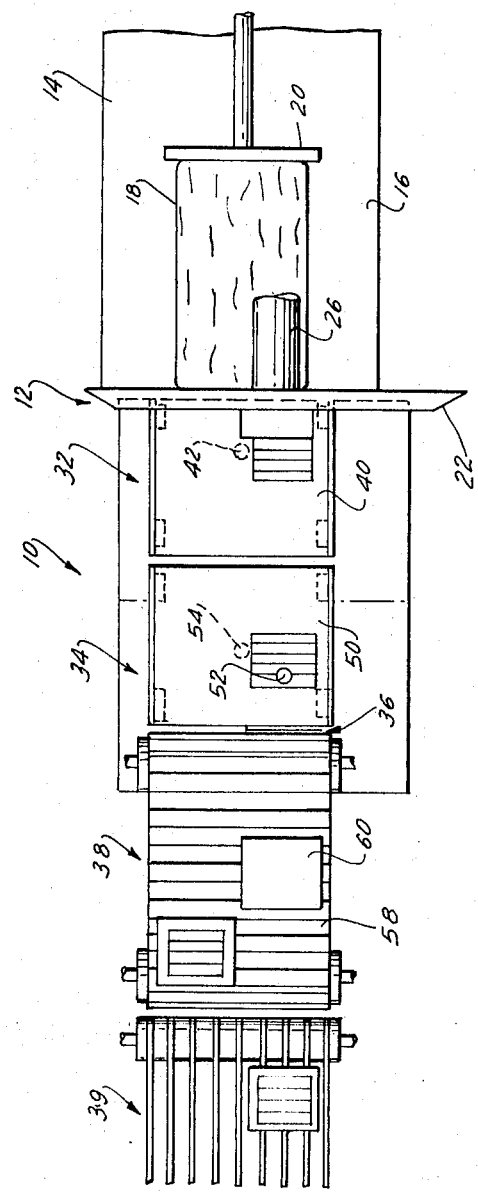
FIG. 2 is a top plan view thereof.

Referring initially to the embodiment of the invention illustrated in FIGS. 1 and 2 the improved measuring and segregating apparatus 10 is applied to the discharge end of a slicing machine 12. The sliced products coming from the slicing machine are discharged on a weigh conveyor belt and there measured, and the measured quantities are then segregated into drafts and transferred to a check weigh belt. The segregated group is weighed again at this station to reflect a more accurate group weight. The difference between this weight and the prescribed weight is then used to generate a signal to adjust the bacon weigh conveyor scale so that the following draft falls within the prescribed weight tolerance.

SLICING MACHINE

The illustrated slicing machine 12 to which the measuring segregating apparatus 10 is particularly applicable is one of a number usable in this invention. Thus, slicing machine 12 may assume the form disclosed in the aforementioned patents and may be the slicing machine available commercially under the Hydro-Matic Slicer which is fully disclosed in the operating instructions for the ANCO No. 827 or 827C Hydro-Matic Bacon Slicer, available from the manufacturer, the Allbright-Nell Company of Chicago, Illinois. For this reason, the slicing machine 12 will not be described in detail and for a more complete explanation thereof, reference should be made to the foregoing references.

Sufficient to say, the slicing machine 12 comprises a supporting table 14 having a platen or feed bed 16 over which the product, particularly bacon, shown at 18, is fed by a feeder or pusher 20 to the slicing blade 22. The bacon is sliced by the blade 22 and then discharged on to the measuring and segregating apparatus 10. Normally the forward or leading edge of the meat product 18 is pressed downwardly against the bed 16 so as to properly engage the blade 22. This may be accomplished by means of a spring pressure plate (not shown) suitably supported adjacent the blade 22. This blade is also encased in a housing (not shown) which serves to protect the operator and also prevents the particles of sliced product from being thrown outwardly from the blade by centrifugal force. In the identified commercially available slicing machines the blade 22 is rotary and is in the form of an eccentric or involute disc which revolves at relatively high speeds. The portion of the blade 22 having the greatest radius serves to slice the edge of the product 18, with the portion of the blade having a minimum radius providing clearance for the product to be fed outwardly thereby permitting the initiation of the next slicing cycle.

Product 18 is continuously fed forwardly by the pusher 20. The belly feed mechanism may be of the type disclosed in commonly assigned application entitled "Improved Continuous Feed Bacon Slicer" filed on even date herewith. When the pusher 20 feeds the product 18 forwardly at a relatively high rate of speed, the thickness of the slices increases, and when it operates at a relatively low rate of speed the thickness of the slice is reduced.

The blade 22 is mounted at the end of a rotatable shaft 26 and this shaft in turn may be driven by mechanism of the type disclosed in the above patents. References should also be made to these references for a complete description of hydraulic circuitry normally associated with the slicing machine 12.

The pusher 20 is reciprocated by a hydraulic cylinder-piston assembly 28. This reciprocation is controlled by a motorized flow control valve 30 forming part of the hydraulic circuitry disclosed in the aforementioned references. In one position of this valve 30, the piston of the assembly 28 and consequently pusher 20 will shift to the left as viewed in FIG. 1 so as to feed the meat product 18 forwardly to be sliced by the blade 22. When the product 18 has been shifted to the left so that all of it has been sliced, the piston of the assembly 28 together with the pusher 20 are automatically retracted upon actuation of the valve 30 to a second retracted position and thereafter another feeding cycle is initiated.

A slice thickness control 31 is provided for increasing or decreasing the rate of travel of the pusher 20 to consequently increase and decrease the slice thickness, respectively. Slice thickness control is disclosed in detail in U.S. Pat. Nos. 2,099,304 granted July 30, 1963; 3,200,864 granted Aug. 17, 1965; and 3,204,676 granted Sept. 7, 1965; and pending patent application Ser. No. 282,651 filed Aug. 22, 1972.

The measuring and segregating apparatus 10 is adapted to receive the slices from the machine 12 and arrange them in shingle fashion and segregate them into groups or drafts of predetermined weight. This is accomplished by momentarily interrupting the feeding of the product 18 when this weight is attained in order to obtain the desired spacing between groups. The segregated groups of slices are check weighed and this weight is compared to a standard representing the initial weight desired. It is this difference which is utilized to adjust the bacon weigher conveyor scale. The drafts are placed on a sheet of cardboard and thereafter permitted to pass if within the accepted weight tolerance or rejected if not. Towards this end, the measuring and segregating apparatus 10 includes a bacon weighing station 32, check weighing station 34, a cardboard dispensing station 36, a rejecting station 38, and a takeaway station 39.

The bacon weighing station 32 is adapted to receive the slices from the slicing machine 12, arrange them in shingle form and, when a prescribed weight of product is reached, to momentarily stop the feed of the product 18 to the slicing blade 22 to segregate one group draft of shingle slices from the next. In this connection, the leading end of a relatively high-speed weighing conveyor 40 is positioned adjacent the discharge end of the slicing machine 12 in order that the formed slices are shingled as a result of the continuous movement of conveyor 40. When a predetermined weight of slices are accumulated on the weighing conveyor 40, they are transferred to the check weighing station 34. The weighing conveyor 40 is supported by a scale 42 which is disposed within the scale cabinet 44. When the proper weight is registered by the scale 42, a signal is sent to the valve 30 through the computer network 48 to momentarily stop the operation of the assembly 28 and consequently pusher 20 which cooperate to feed the product 18 through the knife blade 22.

The conveyor 40 may be of the adjustable variety as disclosed in U.S. Pat. No. 2,969,099 to accommodate one half pound shingled units as well as one pound shingled units. In addition, the conveyor 40 may be of the type disclosed in U.S. Pat. No. 3,200,864 which travels at a low speed during the depositing of the slices thereon and at an increased speed after the weight is registered thereon by scale 42 to remove the drafts theeform in a minimum period of time.

As a result of the impact of slices deposited on the surface of the conveyor 40 and the vibration incident thereto, it has been found that the weight of the segregated groups of slices as registered by the scale 42 depart from the true and prescribed weight.

At the check weighing station 34, a constantly driven conveyor 50 preferably traveling at the same speed as the increased speed of conveyor 40, receives the grouped, shingled slices traveling on conveyor 40. A suitable sensing means such as a photoelectric detector assembly 52 actuates the scale 54 which registers the weight of the group of slices on conveyor 50. This registered weight if outside of the prescribed tolerance range will generate a signal which is fed into the computer network 48 to the scale 42 which will then be adjusted to weigh more or less bacon depending on the direction of error. If the scale has traveling thereon a group of slices that are underweight or outside of the prescribed weight tolerance, a signal is generated and transmitted to the reject station in order that this group may be diverted and the proper weight made by attendant personnel.

The correction signal derived from the check weigher scale 54 will be processed through the computer network 48 to the servo motor 56, the energization of which automatically changes the set point for the bacon weigher scale 42 to weigh more or less through any one of many conventional coupling arrangements, as for example, the mechanism which is employed for slice thickness control discussed in the above. In this manner, the effects of vibration and other error causing elements are offset. Thus, the next bacon draft registered by the bacon weigher scale 42 will be heavy or light depending on the direction of error detected by the check weigher 54. A switch 57 may be provided to simply have the scale conveyor 42 function as in the above referenced patents without any correction by the check weigher scale 54.

The automatic cardboard dispenser 36 is actuated when the shingled group of slices is detected by the detector 52 associated with check weigher 34. On the other hand, the dispenser 36 may be actuated by the mere act of weighing by scale 34. As disclosed in detail in U.S. Pat. Nos. 3,405,504 granted Oct. 15, 1968 and 3,455,083 granted July 15, 1969, the detected group of slices is automatically deposited onto a card when this group is sensed traveling on the conveyor 50 by the detector 52. When this occurs, a card is pushed over a support into the pinch point of feed rollers following a suitable time delay. The rollers feed the card onto the conveyor 58 where the slices are discharged onto the card by the conveyor 50. Thereafter, another card is fed from a magazine and tucked into the pinch point of feed rollers which feed the card onto the support.

Should, for any reason, a group of slices transferred to the conveyor 58 on a card be outside of the prescribed weight tolerance, a reject mechanism will divert this group in a manner disclosed in U.S. Pat. No. 3,200,864. In this connection, a reject mechanism 60 is actuated by a suitably delayed-in-time signal emanating from the network 48 to divert the appropriate draft. An attendant or operator will then bring this group within the limits of proper weight. This adjusted weighed group, as well as the groups which fall within the prescribed weight tolerances, will be permitted to pass onto the takeaway conveyor 39 to the appropriate packaging station.

Thus, in operation, a bacon slab or belly 18 or, for that matter, any other food product is fed into the slicing machine 12. The rate of feed of the product 18 is determined by the rate of advance of the pusher 20 which, in turn, determines the slice thickness. The slices are placed upon the moving conveyor 40 and, when the selected weight is reached, whether one pound or a half pound, as sensed by the scale 42, a signal is generated. This signal is transmitted to the network 48 and the flow control valve 30 is actuated to stop the feed pusher 20. After a predetermined interval, another slicing cycle is started. After the scale 42 senses the weight of the shingled group of slices on conveyor 40, the speed of the conveyor 40 may be increased to remove the weighed group prior to the initiation of the following slicing cycle. The segregated group of slices is then deposited on the check weigh conveyor 50 supported by the scale 54 which may be similar to scale 42 but independent of it. When the group or sliced draft of bacon is totally on the conveyor 50, the photoelectric cell detector 52 is interrupted to initiate the weighing of this group by the scale 54 as well as operation of dispenser 36. If any departure exists between the weights measured by scale 54 and the intended or standard weight, a suitable signal is generated and transmitted from network 48 to the motor 56 to adjust the setting of scale 42. Should scale 54 register an underweight draft, scale 42 will be adjusted to detect weight more than the prescribed weight so as to alter the weight of the package immediately following the one being weighed. If the weight of the draft check weighed is more than necessary, the scale 42 will be adjusted to register less than the prescribed weight. In other words, the scale 42 will be adjusted to neutralize or offset the error detected by the scale 54 to bring the ensuing draft closer to the prescribed weight.

When the newly adjusted draft is sliced out completely onto the bacon weigh conveyor 42, the slicing action will stop and the bacon weigh conveyor 40 will immediately go into high speed (generally about twice as fast as the shingle speed) and rapidly transfer the sliced draft onto a check weigher scale conveyor 50. By means of various interlocks, this conveyor 50 may be made to run at the same speed as the bacon weigher scale conveyor 40, that is, when the bacon weigher conveyor 40 is running at shingle speeds, the conveyor 50 will run at shingle speed, and when the conveyor 40 is run at transfer speed, the conveyor 50 will likewise run at transfer speed. Through a suitable time delay or memory circuit, the signal of the scale 54 serves to trigger reject mechanism 60 associated with the conveyor 58 to permit the draft or group to pass onto the takeaway conveyor 39 or be diverted in order that the proper weight may be made.

Figure 3:
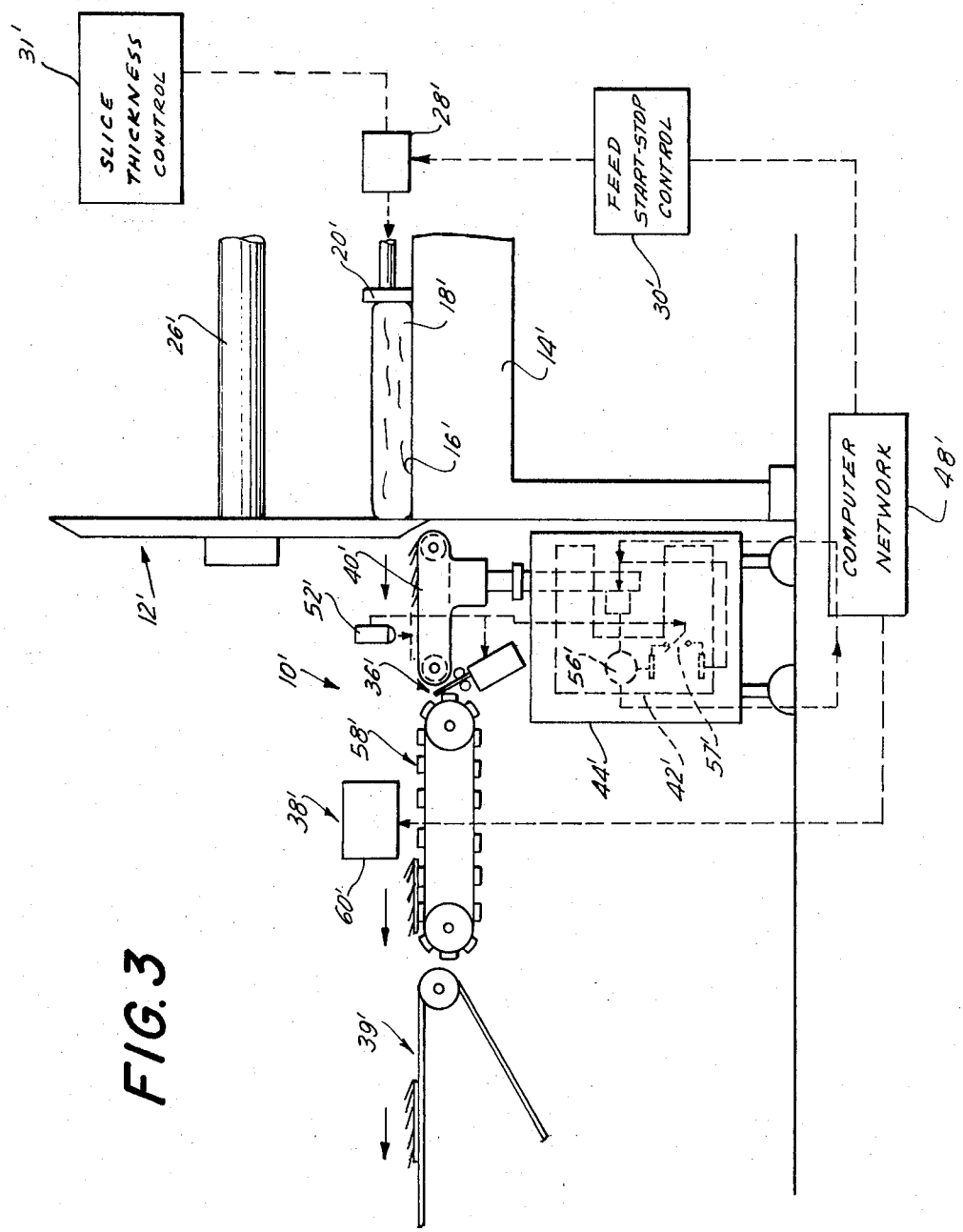
FIG. 3 is a fragmentary side elevational view of an alternative embodiment of apparatus according to the present invention.
Figure 4:
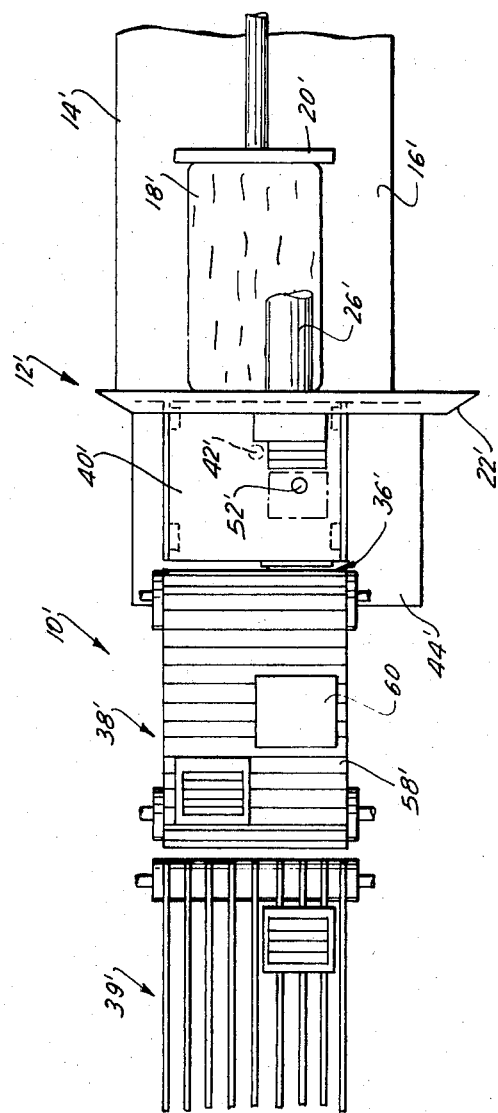
FIG. 4 is a top plan view thereof.

A further embodiment of the invention is shown in FIGS. 3 and 4 in which the bacon weigher 42 serves a dual role including a check weighing function. In this embodiment, like parts will be similarly numbered with an accompanying prime. Thus, as the product 18' is sliced by the blade 22' on the conveyor 40', the slices are accumulated in shingle fashion until the predetermined weight is reached. At this time, scale 42' sends a signal through network 48' to the valve 30', which operates to stop the operation of the pusher 20'. During this interval and as a result of the signal generated by the network 48', the conveyor 40' is stopped long enough to eliminate the effects of vibration, impact, etc. It has been found that approximately 20 milliseconds will under normal circumstances be sufficient. At this point, a second reading is taken by the scale 42'. Ordinarily, this reading will be different from the earlier reading because of the outside extraneous influences. The second reading will be a truer weight reading which will be processed through the network 48' and compared to a signal representing the standard weight; and the difference is utilized to adjust the setting of the scale 42' and consequently the point at which the feeding mechanism is stopped. Again, this same signal will be translated and suitably timed so that, when the package arrives at the reject mechanism 60', the appropriate decision to accept or reject will be made. The slicing cycle is started after the expiration of the predetermined stop interval during which the draft is weighed for the second time and transferred to the take-away conveyor 58'. During this transfer, the draft is placed on a card by the automatic cardboard dispenser 36' coupled with detector 52'.

Thus, the several aforenoted objects and advantages are most effectively attained. Although several somewhat preferred embodiments have been disclosed or described in detail herein, it should be understoodd that this invention is in no sense limited thereby and its scope is to be determined by that of the appended claims.

I claim:

1. The combination with a slicing machine having a slicing blade and feeding mechanism for feeding products to be sliced into the blade, of apparatus for weighing the slice products coming from the machine and separating them into segregated weighed quantities comprising:

receiving and conveying means for receiving the sliced products from the slicing machine;

control means operatively connected to said feeding mechanism for interrupting the operation of the feeding mechanism for a sufficient period of time for the receiving and conveying means to operate to convey the sliced products away;

weighing means operatively connected to the receiving and conveying means for causing the operation of the control means when a predetermined weight of sliced product has been discharged onto the receiving and conveying means to interrupt the operation of the feeding mechanism;

said control means including means automatically initiating the operation of the feeding mechanism after it has been interrupted for a sufficient period of time for the predetermined weight of the sliced products to be conveyed away;

a second receiving and conveying means for receiving the segregated, predetermined quantity of sliced products from the first receiving and conveying means;

second control means for adjusting the setting of the first weighing means; and second weighing means operatively connected to the second receiving and conveying means for causing the operation of the second control means when a predetermined quantity of the sliced products has been weighed by the second receiving and conveying means, said second weighing means feeding back signals to the first weighing means corresponding to the weight of the predetermined quantity of the sliced products on the second receiving and conveying means over and below the prescribed weight to thereby automatically correct the weight of the predetermined quantity of the sliced products weighed on the first receiving and conveying means proportionately to the departure from the prescribed weight as registered by the second weighing means.

2. The invention in accordance with claim 1 wherein the apparatus for arranging products coming from the slicing machine into segregated weighed quantities includes a reject means for rejecting the predetermined quantities of sliced product that are outside prescribed weight tolerances; and a means coupling the reject means with the second weighing means to cause the reject means to be actuated to reject a group of products following registration of this group as outside the prescribed weight tolerance means.

3. The invention in accordance with claim 2 wherein an automatic cardboard dispenser means is interposed between the trailing end of the second receiving and conveying means and reject means for cooperating in placing the group of slices on a card for subsequent packaging.

4. The invention in accordance with claim 3, wherein means are provided for actuating the cardboard dispenser means upon detection of the group of slices by the second weighing means.

5. The invention in accordance with claim 1, wherein the first receiving and conveying means operates at low speeds when receiving the slices from the blade and at a higher speed in transferring.

6. The combination with a slicing machine having a slicing blade and feed mechanism for feeding products to be sliced into the blade, apparatus for weighing the sliced products coming from the machine and separating them into segregated weighed quantities comprising:
receiving and conveying means for receiving the sliced products from the slicing machine;
control means operatively connected to said feeding means for interrupting the operation of the feeding mechanism for a predetermined period of time;
weighing means operatively connected to the receiving and conveying means and causing the operation of the control means when the predetermined quantity of the sliced products has been discharged onto the slicing and conveying means to interrupt the operation of the feeding mechanism;
said control means including means for automatically stopping the operation of the receiving and the conveying means during the interruption of the operation of the feeding mechanism; the control means being operatively connected to the weighing means for automatically actuating the weighing means to weigh the predetermined quantity of sliced products again during the stoppage of the receiving and conveying means, said control means feeding back signals in response to the second weight registered by the weighing means corresponding to the weight of the predetermined group of slices over or below the prescribed weight for the group to thereby automatically adjust the setting of the weighing means to stop the feeding mechanism when the weight of the next group is above or below the prescribed weight by an amount proportional to the departure of this previous group from the prescribed weight.

7. The invention in accordance with claim 6, wherein the apparatus for arranging products coming from the slicing machine into segregated weighed quantities includes a reject means for rejecting the predetermined quantities of sliced product that are outside prescribed weight tolerances; and a means coupling the reject means with the weighing means to cause the reject means to be actuated to reject a group of products following registration of this group as outside the prescribed weight tolerance by said weighing means.

8. The invention in accordance with claim 7, wherein an automatic cardboard dispenser is interposed between the receiving and conveying means and reject means for cooperating in placing the group of slices on a card for subsequent packaging.

9. The invention in accordance with claim 8, wherein means are provided for actuating the cardboard dispenser means upon detection of the group of slices by the second weighing means.

10. The invention in accordance with claim 6, wherein the first receiving and conveying means operates at low speeds when receiving the slices from the blade and at a higher speed in transferring.

11. The combination with a slicing machine having a slicing blade and feeding mechanism for feeding the products to be sliced into the blade, apparatus for weighing the sliced products coming from the machine and separating them into segregated weighed quantities comprising;
receiving and conveying means for receiving the sliced products;
control means for interrupting the operation of the feeding mechanism and to increase and decrease the advance of the feeding mechanism and consequently increase and decrease the slice thickness;
means for initially weighing and registering the weight of the group of sliced product and actuating the control means to interrupt the operation of the feeding mechanism, and means for registering the weight of this group a second time to actuate the control means to adjust slice thickness corresponding to the weight of the group over and below the prescribed weight for the group to thereby automatically adjust the setting of the weighing means to stop the feeding mechanism when the weight of the next group is above or below the prescribed weight by an amount proportional to the departure of this previous group from the prescribed weight.

12. The invention in accordance with claim 11 wherein the apparatus for arranging products coming from the slicing machine into segregated weighed quantities includes a reject means for rejecting the predetermined quantities of sliced product that are underweight; and a means coupling the reject means with the second weighing means to cause the reject means to be actuated to reject a predetermined group of products following registration of an underweight of this stack by said second weighing means.

13. The invention in accordance with claim 12 wherein a cardboard dispenser is at the trailing end of the receiving and conveying means for cooperating in placing the group of slices on a card for subsequent packaging.

14. The invention in accordance with claim 13, wherein means are provided for actuating the cardboard dispenser means upon detection of the group of slices by the second weighing means.

15. The invention in accordance with claim 11, wherein the first receiving and conveying means operates at low speeds when receiving the slices from the blade and at a higher speed in transferring.

* * * * *